(12) United States Patent
Matsushima et al.

(10) Patent No.: US 10,006,447 B2
(45) Date of Patent: Jun. 26, 2018

(54) LIQUID-PRESSURE DRIVING SYSTEM

(71) Applicant: KAWASAKI JUKOGYO KABUSHIKI KAISHA, Kobe-shi, Hyogo (JP)

(72) Inventors: Hirohide Matsushima, Kobe (JP); Takashi Okashiro, Kakogawa (JP); Hideyasu Muraoka, Akashi (JP); Yoji Yudate, Kobe (JP); Kazuya Iwabe, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days. days.

(21) Appl. No.: 15/504,802

(22) PCT Filed: Aug. 19, 2015

(86) PCT No.: PCT/JP2015/004128
§ 371 (c)(1),
(2) Date: Feb. 17, 2017

(87) PCT Pub. No.: WO2016/027464
PCT Pub. Date: Feb. 25, 2016

(65) Prior Publication Data
US 2017/0268490 A1  Sep. 21, 2017

(30) Foreign Application Priority Data
Aug. 20, 2014 (JP) .................................. 2014-167548

(51) Int. Cl.
*F04B 1/32* (2006.01)
*F02B 67/08* (2006.01)
(Continued)

(52) U.S. Cl.
CPC ............. *F04B 1/324* (2013.01); *B60W 20/15* (2016.01); *F02B 67/08* (2013.01); *F02D 29/04* (2013.01);
(Continued)

(58) Field of Classification Search
CPC .... F02D 29/04; F02D 41/021; F02D 41/1497; F02D 11/06; F02D 2250/26; F02D 29/00;
(Continued)

(56) References Cited

U.S. PATENT DOCUMENTS 7,344,473 B2 * 3/2008 Ishibashi ............. B60W 10/103
477/52
7,788,917 B2 * 9/2010 DeMarco .............. F16H 61/433
60/445

(Continued)

FOREIGN PATENT DOCUMENTS

JP   20110063089 A   3/2011
JP   2012-180683 A   9/2012

(Continued)

OTHER PUBLICATIONS

Nov. 10, 2015 Search Report issued in International Patent Application No. PCT/JP2015/004128.

(Continued)

*Primary Examiner* — Long T Tran
(74) *Attorney, Agent, or Firm* — Oliff PLC

(57) ABSTRACT

An oil-pressure driving system includes a variable displacement oil-pressure pump, a tilting angle adjuster, an electric motor, and a control device. In the control device, a target assist torque calculating portion calculates a target assist torque, a first torque limiting portion limits the target assist torque to an output value that is a virtual limit value or less, and a drive control portion controls the electric motor such that the electric motor outputs a command torque corre- (Continued)

sponding to the output value. Further, in the control device, a torque deficiency calculating portion calculates a torque deficiency by subtracting the output value from the target assist torque, a tilting angle calculating portion calculates a tilting angle command value by which the output torque of the oil-pressure pump is reduced by the torque deficiency, and a tilting angle control portion outputs a tilt signal corresponding to the tilting angle command value to the tilting angle adjuster.

7 Claims, 6 Drawing Sheets

(51) Int. Cl.
  *B60W 20/15* (2016.01)
  *F02D 29/04* (2006.01)
  *F04B 17/05* (2006.01)
  *E02F 9/22* (2006.01)
  *E02F 3/32* (2006.01)
  *E02F 9/20* (2006.01)
(52) U.S. Cl.
  CPC ............. *F04B 17/05* (2013.01); *E02F 3/32* (2013.01); *E02F 9/2004* (2013.01); *E02F 9/2232* (2013.01); *E02F 9/2296* (2013.01)
(58) Field of Classification Search
  CPC ......... B60W 2300/17; B60W 2710/083; F04B 17/05; F04B 1/324; F04B 2201/1202; F04B 2203/06; F04B 2203/0603; F04B 2205/09
  See application file for complete search history.

(56) References Cited

U.S. PATENT DOCUMENTS

| | | | |
|---|---|---|---|
| 8,744,654 B2* | 6/2014 | Wu | B60K 6/485 180/65.22 |
| 2011/0238264 A1* | 9/2011 | Wu | B60K 6/485 701/36 |
| 2014/0148984 A1 | 5/2014 | Nishi et al. | |
| 2014/0371915 A1* | 12/2014 | Ishihara | B60K 6/485 700/275 |
| 2015/0225927 A1* | 8/2015 | Hoshino | F02D 29/02 701/50 |
| 2015/0275484 A1* | 10/2015 | Ishihara | E02F 9/2075 701/50 |

FOREIGN PATENT DOCUMENTS

| | | |
|---|---|---|
| JP | 2013-203234 A | 10/2013 |
| WO | 2010150382 A1 | 12/2010 |

OTHER PUBLICATIONS

Feb. 21, 2017 International Preliminary Report on Patentability issued in International Patent Application No. PCT/JP2015/004128.

* cited by examiner

LIQUID-PRESSURE DRIVING SYSTEM

TECHNICAL FIELD

The present invention relates to a liquid-pressure driving system configured to control a tilting angle of a variable displacement liquid-pressure pump configured to be driven by an engine and an electric motor and change an ejection amount in accordance with the tilting angle.

BACKGROUND ART

A construction machine or the like includes an oil-pressure pump, and the oil-pressure pump ejects pressure oil when an operating lever or the like is operated. The ejected pressure oil is introduced to an oil-pressure actuator, such as an oil-pressure cylinder, to operate the oil-pressure actuator. An arm, a boom, and the like operate by the operation of the oil-pressure actuator. The oil-pressure pump is coupled to an engine and an electric motor through a rotating shaft and is rotated by the engine and the electric motor. As the construction machine configured as above, for example, a construction machine of PTL 1 is known.

In the construction machine of PTL 1, the engine is controlled by a control device such that the revolution speed of the engine becomes a revolution speed command. However, the revolution speed of the engine decreases when a load is applied to the oil-pressure pump, such as when the oil-pressure pump drives the oil-pressure actuator. When the revolution speed of the engine decreases, and this increases a deviation between the revolution speed of the engine and the revolution speed command, the control device causes the electric motor to assist the engine. Thus, the control device maintains the revolution speed of the engine (specifically, the revolution speed command) constant.

In the construction machine of PTL 1, when a large load is applied to the oil-pressure pump, an upper limit of an absorbing torque of the oil-pressure pump is reduced. The upper limit of the absorbing torque is set in accordance with an engine revolution speed deviation $\Delta N$ (deviation between an actual revolution speed and a target revolution speed) based on a predetermined control characteristic.

CITATION LIST

Patent Literature

PTL 1: Japanese Laid-Open Patent Application Publication No. 2012-180683

SUMMARY OF INVENTION

Technical Problem

In the construction machine of PTL 1, the upper limit of the absorbing torque is determined in accordance with the revolution speed deviation $\Delta N$. Therefore, even in a case where a large load is applied to the oil-pressure pump, and this steeply decreases the revolution speed of the engine, the upper limit of the absorbing torque cannot be suppressed until the revolution speed deviation $\Delta N$ reaches a set value. In this case, a time lag occurs between the decrease in the revolution speed of the engine and an engine assist. Therefore, the engine revolution speed may excessively decreases.

The present invention provides a liquid-pressure driving system capable of decreasing an output torque of a liquid-pressure pump to prevent a revolution speed of an engine from excessively decreasing.

Solution to Problem

A liquid-pressure driving system of the present invention includes: a variable displacement liquid-pressure pump rotated by an output torque of an engine and configured to eject a pressure liquid, an ejection amount of which corresponds to a tilting angle of the liquid-pressure pump; a tilting angle adjuster configured to adjust the tilting angle of the liquid-pressure pump in accordance with a tilting angle command input to the tilting angle adjuster; an electric motor configured to assist the output torque of the engine to rotate the liquid-pressure pump; and a control device configured to control the electric motor such that a revolution speed of the engine becomes a preset target engine revolution speed and also control the tilting angle adjuster such that the liquid-pressure pump ejects the pressure liquid at a required flow rate corresponding to an operation amount of an operating device, wherein: the control device includes a target assist torque calculating portion, a target assist torque limiting portion, a drive control portion, a torque deficiency calculating portion, a tilting angle calculating portion, and a tilting angle control portion; the target assist torque calculating portion calculates a target assist torque output from the electric motor configured to assist the engine; the target assist torque limiting portion limits the target assist torque to an output value that is a preset limit value or less; the drive control portion controls the electric motor such that the electric motor outputs a command torque corresponding to the output value; the torque deficiency calculating portion calculate a torque deficiency, which is a deficiency, in accordance with the target assist torque and the output value; the tilting angle calculating portion calculates a tilting angle command value by which an output torque of the liquid-pressure pump is reduced by the torque deficiency calculated by the torque deficiency calculating portion; and the tilting angle control portion outputs a tilting angle command to the tilting angle control device to control the tilting angle control device, the tilting angle command corresponding to the tilting angle command value calculated by the tilting angle calculating portion.

According to the present invention, when the target assist torque becomes the limit value or more, the target assist torque is limited to the output value that is the limit value or less, and the electric motor outputs the command torque corresponding to the output value. On the other hand, the torque deficiency calculating portion calculates the torque deficiency that is a deficiency generated by limiting the target assist torque to the limit value or less. The tilting angle calculating portion calculates the tilting angle command value by which the liquid-pressure pump ejects the pressure fluid at a correction flow rate obtained by subtracting a reduced flow rate corresponding to the torque deficiency from the required flow rate. Further, the tilting angle control portion controls the tilting angle control device such that the tilting angle becomes the tilting angle command value. With this, the output torque of the liquid-pressure pump can be reduced by the torque deficiency, and the decrease in the revolution speed of the engine by the deficiency of the torque can be suppressed. Further, the tilting angle is adjusted based on the torque deficiency calculated based on the target assist torque. Therefore, the tilting angle control can be performed before the revolution speed of the engine steeply decreases. On this account, the excessive decrease in the revolution speed of the engine can be suppressed as compared to a conventional technology which adjusts the tilting angle based on the revolution speed difference.

The above invention may be configured such that: the control device includes a reduced torque estimating portion, an excess/deficiency calculating portion, and a torque correcting portion; the reduced torque estimating portion estimates a reduced torque of the liquid-pressure pump by tilting angle control of adjusting the tilting angle of the liquid-pressure pump to the tilting angle command value; based on the reduced torque estimated by the reduced torque estimating portion, the excess/deficiency calculating portion calculates an excess or deficiency of the reduced torque with respect to the torque deficiency, the excess or deficiency being generated by a response delay of the tilting angle of the liquid-pressure pump in the tilting angle control; and the torque correcting portion adds the excess or deficiency of the reduced torque to the output value to correct the output value.

According to the above configuration, the excess or deficiency of the reduced torque due to the response delay in the tilting angle control can be compensated by the increase or decrease in the output torque of the electric motor. Therefore, the deficiency of the assist torque due to the response delay can be suppressed, and the decrease in the revolution speed of the engine can be suppressed.

The above invention may be configured such that the reduced torque estimating portion estimates the reduced torque by a transfer function including a first-order lag element.

According to the above configuration, the reduced torque can be calculated more accurately. With this, the decrease in the revolution speed of the engine can be further suppressed.

The above invention may be configured such that: the control device includes a command torque limiting portion; the command torque limiting portion limits the command torque to a maximum allowable torque or less, the maximum allowable torque being larger than the limit value.

According to the above configuration, a case where the electric motor outputs the command torque that is the maximum allowable torque or more can be prevented. With this, the damage of the electric motor due to the excessive output of the output torque can be prevented.

The above invention may further include: an electric power supply device configured to supply electric power to the electric motor; and a state value detection sensor configured to detect a state value showing a state of the electric power supply device, wherein the target assist torque limiting portion may change the limit value in accordance with a detection result that is the state value.

According to the above configuration, when the maximum torque of the electric motor is limited in accordance with the state of a power supply device, the limit value can be changed in accordance with the state of the power supply device. With this, a case where the electric motor cannot output the command torque can be suppressed.

The above invention may be configured such that: the control device includes a target fuel injection quantity calculating portion, an injection quantity limiting portion, an actual torque calculating portion, a target torque calculating portion, and a difference torque calculating portion; the target fuel injection quantity calculating portion calculates a target fuel injection quantity corresponding to a target revolution speed; the injection quantity limiting portion has a function of gradually increasing an actual fuel injection quantity to the target fuel injection quantity calculated by the target fuel injection quantity calculating portion and determines the actual fuel injection quantity such that a time change rate of the actual fuel injection quantity when increasing the actual fuel injection quantity becomes a predetermined value or less; the actual torque calculating portion calculates an actual torque based on the actual revolution speed detected by the revolution speed sensor and the actual fuel injection quantity determined by the injection quantity limiting portion, the actual torque being output from the engine; the target torque calculating portion calculates a target torque based on the actual revolution speed detected by the revolution speed sensor and the target fuel injection quantity calculated by the target fuel injection quantity calculating portion, the target torque being applied to a rotating shaft; the difference torque calculating portion calculates a difference torque that is a deficiency of the actual torque calculated by the actual torque calculating portion with respect to the target torque calculated by the target torque calculating portion; and the target assist torque calculating portion calculates the target assist torque based on the difference torque calculated by the difference torque calculating portion.

According to the above configuration, although the deficiency of the output torque of the engine is generated by limiting the time change rate of the actual fuel injection quantity, the deficiency of the output torque is calculated in advance as the difference torque. Therefore, even when the actual fuel injection quantity is limited, the torque output from the entire oil-pressure driving system can be made close to the target torque by the output of the difference torque from the electric motor. Thus, the decrease in the torque output from the entire oil-pressure driving system can be suppressed. As above, the oil-pressure driving system performs the torque adjustment by estimating the change amount of the output torque in advance and causing the electric motor to output the torque corresponding to the deficiency, the change amount being generated due to the limitation of the time change rate. Thus, the excessive decrease in the revolution speed of the engine E can be suppressed as compared to a case where the torque adjustment is performed in accordance with a revolution speed deviation. With this, the decrease in the fuel efficiency of the engine due to the excessive decrease in the revolution speed of the engine can be suppressed.

The above invention may be configured such that: the control device includes an actual fuel injection quantity calculating portion, a torque change estimating portion, and a change torque calculating portion; the fuel injection quantity calculating portion calculates an actual fuel injection quantity corresponding to a target revolution speed; the torque change estimating portion estimates a change in the output torque of the engine per unit revolution speed with respect to the actual fuel injection quantity calculated by the fuel injection quantity calculating portion; the change torque calculating portion calculates a change torque based on the change in the output torque per unit revolution speed, the change torque being used to assist the output torque of the engine, the change being calculated by the torque change estimating portion; and the target assist torque calculating portion calculates the target assist torque based on the change torque calculated by the change torque calculating portion.

According to the above configuration, the change amount of the output torque due to, for example, the deterioration of the combustion state of the engine by the change in the actual fuel injection quantity is estimated in advance, and the change torque is calculated based on the estimated change amount. The calculated change torque is output from the electric motor. With this, the electric motor can assist the output torque of the engine. When the output torque changes, the electric motor can output the torque corresponding to this change. For example, even in a case where the target fuel injection quantity steeply increases when a load is applied to the liquid-pressure pump, and this deteriorates the combustion state, the decrease in the output torque due to this deterioration and the excessive decrease in the revolution speed can be prevented. With this, the decrease in the fuel efficiency of the engine due to the excessive decrease in the revolution speed can be suppressed.

ADVANTAGEOUS EFFECTS OF INVENTION

The present invention can decrease the load of the liquid-pressure pump so as to prevent the excessive decrease in the revolution speed of the engine.

The above object, other objects, features, and advantages of the present invention will be made clear by the following detailed explanation of preferred embodiments with reference to the attached drawings.

DESCRIPTION OF EMBODIMENTS

Figure 1:
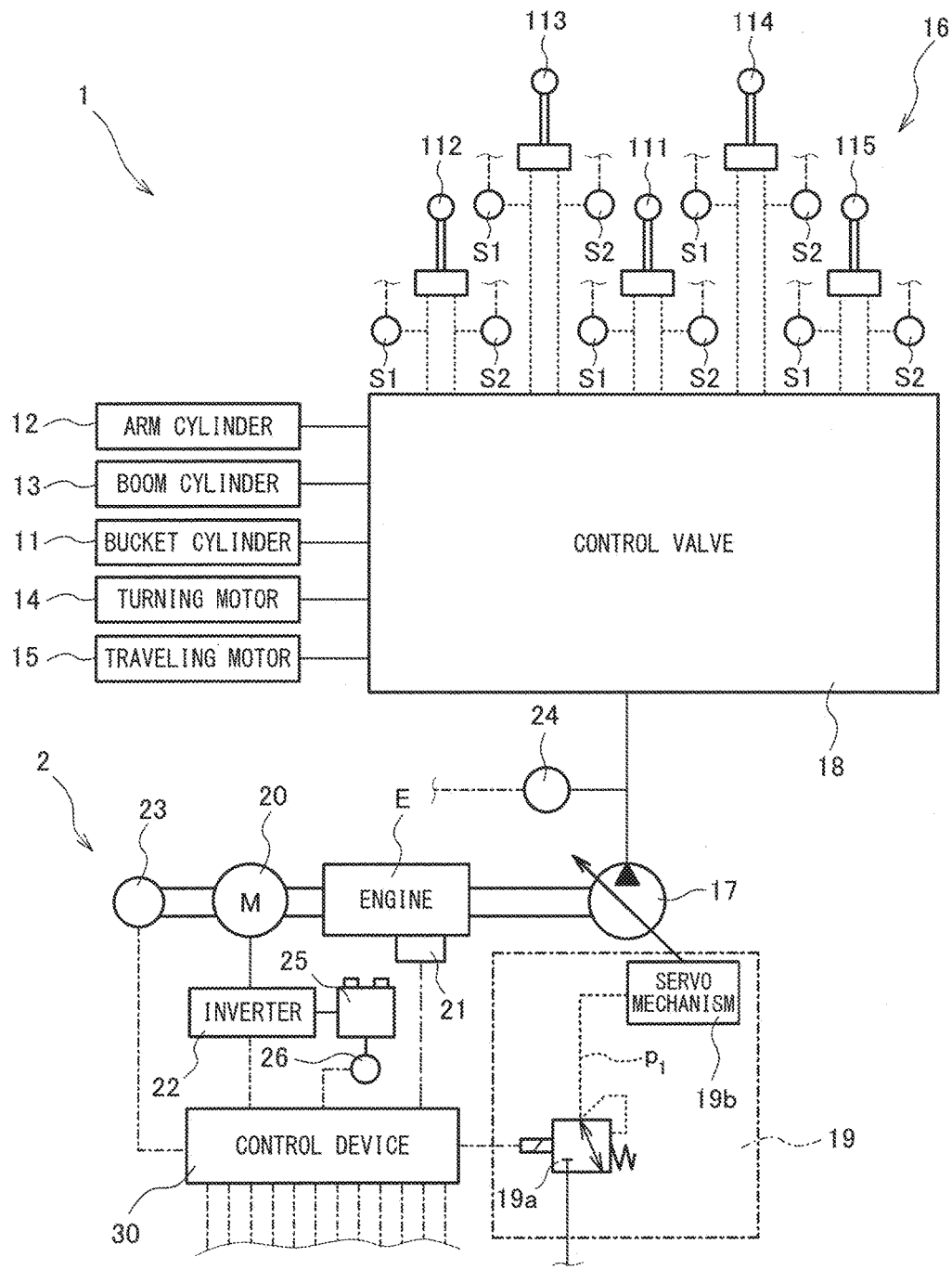
FIG. 1 is a block diagram showing an oil-pressure driving system according to an embodiment of the present invention.

Hereinafter, an oil-pressure driving system 1 according to an embodiment of the present invention will be explained in reference to the drawings. It should be noted that directions mentioned in the following explanations are used for convenience sake, and directions, etc. of configurations of the present invention are not limited to those directions. Further, the oil-pressure driving system 1 explained below is just one embodiment of the present invention. Therefore, the present invention is not limited to the embodiment, and additions, deletions, and modifications may be made within the scope of the present invention.

A construction machine includes various attachments, such as a bucket, a loader, a blade, and a hoist, and these attachments are operated by an oil-pressure actuator, such as an oil-pressure cylinder or an oil-pressure motor (electro-hydraulic motor). For example, a hydraulic excavator that is one type of construction machine includes a bucket, an arm, and a boom and can perform works, such as excavation, while operating these three members. The bucket, the arm, and the boom are provided with oil-pressure cylinders 11 to 13, respectively. The bucket, the arm, and the boom operate by supplying pressure oil to the cylinders 11 to 13.

The hydraulic excavator includes a traveling device, and a turning body is attached onto the traveling device so as to be turnable. The boom is attached to the turning body so as to be swingable in an upward/downward direction. An oil-pressure type turning motor 14 is attached to the turning body, and the turning body turns by supplying the pressure oil to the oil-pressure type turning motor 14. An oil-pressure type traveling motor 15 is attached to the traveling device, and the traveling device moves forward or backward by supplying the pressure oil to the traveling motor 15.

Further, the hydraulic excavator is provided with a plurality of operating levers 111 to 115 corresponding to the oil-pressure actuators 11 to 15, respectively. An oil-pressure supply device 16 is connected to the oil-pressure actuators 11 to 15 (i.e., the oil-pressure cylinders 11 to 13 and the oil-pressure motors 14 and 15). When any one of the operating tools 111 to 115 is operated, the pressure oil is supplied from the oil-pressure supply device 16 to the corresponding oil-pressure actuator (11 to 15), and the corresponding oil-pressure actuator (11 to 15) operates.

Next, the oil-pressure supply device 16 will be explained in detail. The oil-pressure supply device 16 includes an oil-pressure pump 17, a control valve 18, and a tilting angle adjuster 19. The oil-pressure pump 17 includes a rotating shaft 17a and rotates the rotating shaft 17a to eject the pressure oil. The ejected pressure oil is introduced to the control valve 18. The control valve 18 controls the flow of the pressure oil such that when any one of the operating tools 111 to 115 is operated, the pressure oil is supplied to the corresponding oil-pressure actuator (11 to 15).

Explanations will be made in more detail. When each of the operating tools 111 to 115 is operated, it outputs pilot pressure that is pressure corresponding to an operation direction and an operation amount. The control valve 18 controls the flow of the pressure oil ejected in accordance with the pilot pressure ejected from the operating tool (111 to 115) and supplies the pressure oil to the oil-pressure actuator (11 to 15) corresponding to the operating tool (111 to 115), which has been operated, to operate this oil-pressure actuator (11 to 15). Further, the control valve 18 supplies the pressure oil, the flow rate of which corresponds to the pilot pressure output from the operating tool (111 to 115), to the corresponding oil-pressure actuator (11 to 15). With this, the oil-pressure actuator (11 to 15) operates at a speed corresponding to the operation amount of the operating tool (111 to 115). Thus, the bucket, the arm, the boom, or the like can operate at the speed corresponding to the operation amount of the operating tool (111 to 115).

The oil-pressure supply device 16 configured as above constitutes a positive control type oil-pressure system in the present embodiment, and an ejection amount of the oil-pressure pump 17 is increased or decreased in accordance with the operation amount of the operating tool (111 to 115). It should be noted that the oil-pressure supply device 16 may constitute a negative control type oil-pressure system. The configuration of the oil-pressure supply device 16 will be explained in more detail. Adopted as the oil-pressure pump 17 is a variable displacement pump, such as a variable displacement swash plate pump. The oil-pressure pump 17 can change the ejection amount by changing the tilting angle of a swash plate 17b. The oil-pressure pump 17 is provided with the tilting angle adjuster 19 configured to change the tilting angle of the swash plate 17b.

The tilting angle adjuster 19 includes a tilting angle adjusting valve 19a and a servo mechanism 19b. The tilting angle adjusting valve 19a is, for example, a solenoid-operated pressure reducing valve and is connected to a pilot pump (not shown). The tilting angle adjusting valve 19a outputs command pressure pl corresponding to a tilt signal (tilting angle command) input thereto. The tilting angle adjusting valve 19a is connected to the servo mechanism 19b, and the command pressure $p_1$ output from the tilting angle adjusting valve 19a is introduced to the servo mechanism 19b.

The servo mechanism 19b includes a servo piston (not shown). The swash plate 17b is coupled to the servo piston. The tilting angle of the swash plate 17b can be changed by the movement of the servo piston. The servo piston moves in accordance with the command pressure $p_1$ input thereto. Therefore, the tilting angle of the swash plate 17b is adjusted to an angle corresponding to the command pressure $p_1$. To be specific, the tilting angle of the swash plate 17b is adjusted to an angle corresponding to the tilt signal. Further, an oil-pressure pump driving device 2 is provided at the rotating shaft 17a of the oil-pressure pump 17, and the rotating shaft 17a is rotated by the oil-pressure pump driving device 2.

The oil-pressure pump driving device 2 is a hybrid driving system including an engine E and an electric motor 20. Both the engine E and the electric motor 20 are coupled to the rotating shaft 17a of the oil-pressure pump 17. The engine E is a diesel engine including, for example, a plurality of cylinders, and fuel injectors 21 are provided so as to correspond to the respective cylinders. Each of the fuel injectors 21 is constituted by, for example, a fuel pump and a solenoid-operated control valve, and inject a fuel, the amount of which corresponds to an injection command input thereto, to a combustion chamber of the corresponding cylinder. The engine E combusts the fuel injected from the fuel injectors 21 to cause pistons (not shown) to perform reciprocating movements. This rotates the rotating shaft 17a, and therefore, the pressure oil is ejected from the oil-pressure pump 17. In the present embodiment, the engine E is a diesel engine. However, the engine E is not necessarily a diesel engine and may be a gasoline engine. Further, the electric motor 20 configured to assist the driving of the engine E is provided at the rotating shaft 17a.

The electric motor 20 is, for example, an AC motor and is connected to an inverter 22. The inverter 22 that is a driving device is coupled to a battery 25 and converts a direct current, supplied from the battery 25, into an alternating current to supply the alternating current to the electric motor 20. The inverter 22 supplies to the electric motor 20 the alternating current having a frequency and voltage corresponding to a torque command input thereto, and the torque corresponding to the torque command (below-described assist torque) is output from the electric motor 20 to the rotating shaft 17a.

A revolution speed sensor 23 is attached to the rotating shaft 17a and outputs a signal corresponding to the revolution speed of the rotating shaft 17a. The revolution speed sensor 23 is electrically connected to a control device 30 together with the inverter 22 and the solenoid-operated control valves of the fuel injectors 21. Further, an ejection pressure sensor 24, a plurality of pilot pressure sensors S1 and S2, and a battery sensor 26 are electrically connected to the control device 30. The ejection pressure sensor 24 is a sensor configured to detect ejection pressure of the oil-pressure pump 17 and outputs to the control device 30 a signal corresponding to the ejection pressure. The pilot pressure sensor S1 and the pilot pressure sensor S2 are provided so as to correspond to each of the operating tools 111 to 115. Each of the pilot pressure sensors S1 and S2 is a sensor configured to detect the pilot pressure output from the corresponding operating tool (111 to 115) and outputs to the control device 30 a signal corresponding to the pilot pressure. The battery sensor 26 is a sensor configured to detect a state value showing states of the battery, such as a voltage (i.e., a charge amount), a temperature, etc. of the battery, and outputs to the control device 30 a signal corresponding to the states of the battery.

Figure 2:
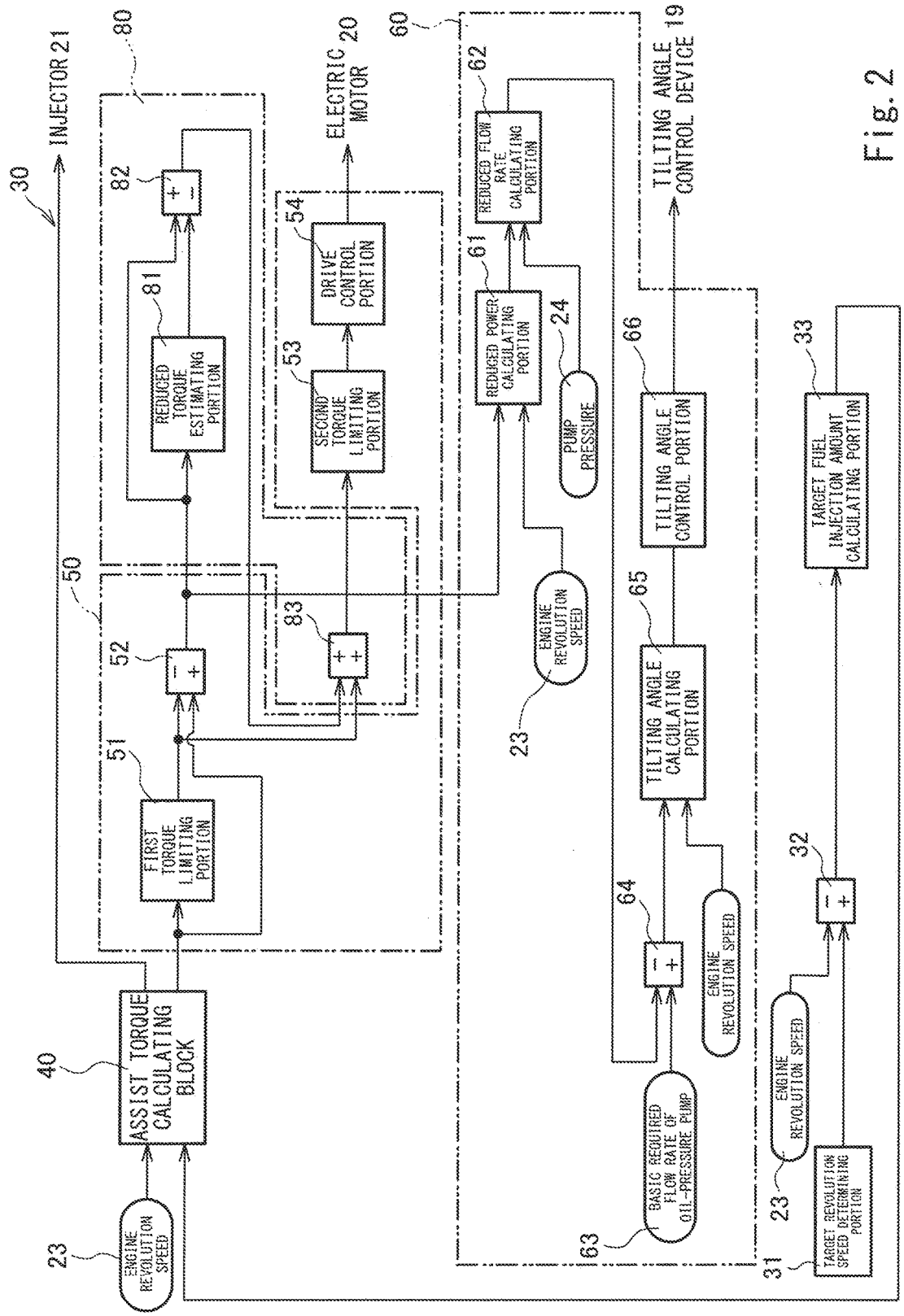
FIG. 2 is a functional block diagram showing functions of a control device of the oil-pressure driving system of FIG. 1 as blocks.

As shown in FIG. 2, the control device 30 includes functional portions that calculate various values. The following explanations will be made while dividing the functional portions, which calculate various values, into blocks. The control device 30 includes a target revolution speed determining portion 31, a revolution speed difference calculating portion 32, and a target fuel injection quantity calculating portion 33. The target revolution speed determining portion 31 determines a target revolution speed of the engine based on a revolution speed input from an input unit (a dial, a button, a touch panel, or the like) or a preset revolution speed. The revolution speed difference calculating portion 32 calculates an actual revolution speed of the rotating shaft 17a based on a signal input from the revolution speed sensor 23. The revolution speed difference calculating portion 32 calculates a difference between the calculated actual revolution speed and the target revolution speed determined by the target revolution speed determining portion 31. Based on the difference between the actual revolution speed and the target revolution speed, the target fuel injection quantity calculating portion 33 calculates a target fuel injection quantity to be injected from the fuel injectors 21.

The control device 30 calculates an actual fuel injection quantity by a below-described method based on the target fuel injection quantity and causes the fuel injectors 21 to inject the actual fuel injection quantity. It should be noted that the control device 30 calculates the actual revolution speed and the target fuel injection quantity at predetermined intervals. Further, when the torque from the engine E is not enough, the control device 30 drives the electric motor 20 to assist the engine E and reduces an output torque of the oil-pressure pump 17. Hereinafter, such functions of the control device 30 will be explained in more detail in reference to FIGS. 2 and 3.

Figure 3:
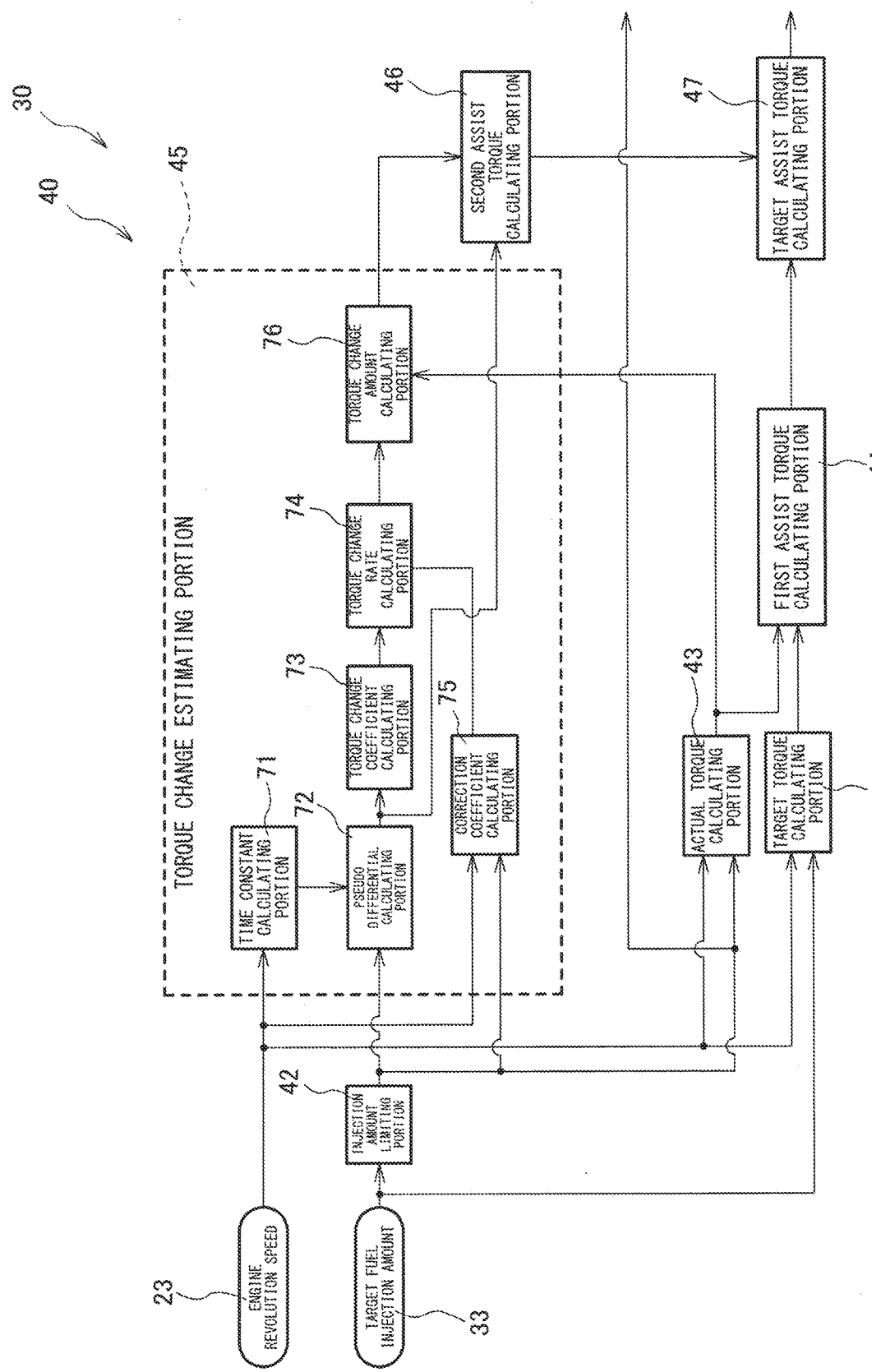
FIG. 3 is a functional block diagram showing an assist torque block of the control device of FIG. 2 for detailed explanations.

The control device 30 includes an assist torque calculating block 40, a torque limiting block 50, and a tilting angle control block 60. The assist torque calculating block 40 calculates the assist torque and the actual fuel injection quantity (the amount of fuel to be injected actually) in accordance with the target fuel injection quantity calculated by the target fuel injection quantity calculating portion 33 and the actual revolution speed calculated based on the signal input from the revolution speed sensor 23. As shown in FIG. 3, the assist torque calculating block 40 includes a target torque calculating portion 41, an injection quantity limiting portion 42, an actual torque calculating portion 43, and a first assist torque calculating portion 44.

The target torque calculating portion 41 calculates a target torque by using a target torque map. The target torque map is a map in which the target torque output by the entire oil-pressure pump driving device 2 is associated with the target fuel injection quantity and the actual revolution speed. The target torque calculating portion 41 calculates the target torque from the target torque map based on the calculated target fuel injection quantity and the calculated actual revolution speed. The target fuel injection quantity calculated by the target fuel injection quantity calculating portion 33 is used for calculating by the injection quantity limiting portion 42 the actual fuel injection quantity that is the amount of fuel actually injected by the fuel injectors 21.

The injection quantity limiting portion 42 (actual fuel injection quantity calculating portion) includes a rate limit function which limits an increasing rate but does not limit a decreasing rate. The injection quantity limiting portion 42 calculates the actual fuel injection quantity based on the target fuel injection quantity by the rate limit function. Explanations will be made in more detail. When the target fuel injection quantity increases, and the increasing rate of the target fuel injection quantity exceeds a predetermined value, the injection quantity limiting portion 42 gradually changes the actual fuel injection quantity to the target fuel injection quantity while limiting a change rate or change amount of the actual fuel injection quantity based on a predetermined change rule. In contrast, when the target fuel injection quantity decreases, the injection quantity limiting portion 42 does not limit the decreasing rate and sets the target fuel injection quantity as the actual fuel injection quantity.

In the present embodiment, the injection quantity limiting portion 42 holds (i.e., stores) therein the target fuel injection quantity calculated by the target fuel injection quantity calculating portion 33 and compares the held target fuel injection quantity with the next target fuel injection quantity calculated immediately after the calculation of the held target fuel injection quantity. When the next target fuel injection quantity is smaller than the held target fuel injection quantity, that is, when the target fuel injection quantity is decreasing, the injection quantity limiting portion 42 calculates the actual fuel injection quantity as the target fuel injection quantity. In contrast, when the next target fuel injection quantity is larger than the held target fuel injection quantity, that is, when the target fuel injection quantity is increasing, the injection quantity limiting portion 42 determines that whether or not the increasing rate (in the present embodiment, a difference between the two target fuel injection quantities) exceeds a predetermined value. When the increasing rate is the predetermined value or less, the injection quantity limiting portion 42 calculates the actual fuel injection quantity as the target fuel injection quantity. In contrast, when the increasing rate exceeds the predetermined value, the injection quantity limiting portion 42 gradually increases the actual fuel injection quantity to the target fuel injection quantity while limiting the increasing rate based on the change rule by which the increasing rate is set to the predetermined value or less. To be specific, when the increasing rate exceeds the predetermined value, the injection quantity limiting portion 42 gradually increases the actual fuel injection quantity to the target fuel injection quantity in proportion to time based on a proportionality constant that is the predetermined value or less. It should be noted that the injection quantity limiting portion 42 may be a filter, and for example, the target fuel injection quantity may be increased based on a transfer function including a first-order lag element (i.e., lag element). The actual fuel injection quantity calculated as above is used together with the actual revolution speed for calculating an actual torque by the actual torque calculating portion 43.

The actual torque calculating portion 43 calculates the actual torque by using an actual torque map. The actual torque is the output torque output from the engine E when the fuel injectors 21 inject the actual fuel injection quantity to the engine E. The actual torque map is a map in which the actual torque is associated with the actual fuel injection quantity and the actual revolution speed. The actual torque calculating portion 43 calculates the actual torque from the actual torque map based on the calculated actual fuel injection quantity and the calculated actual revolution speed. In the present embodiment, the actual torque map and the target torque map are the same as each other. The calculated actual torque is used together with the target torque for calculating a first assist torque by the first assist torque calculating portion 44, the first assist torque being output from the electric motor 20.

Based on the actual torque and target torque calculated from one target fuel injection quantity, the first assist torque calculating portion 44 (difference torque calculating portion) calculates the first assist torque (difference torque) that is a torque deficiency obtained by subtracting the actual torque from the target torque. Explanations will be made in more detail. The first assist torque calculating portion 44 subtracts the actual torque from the target torque. With this, the first assist torque that is the deficiency when the target torque is generated from the oil-pressure pump driving device 2 is calculated.

As above, when the target fuel injection quantity steeply increases, the assist torque calculating block 40 limits the increasing rate of the injection quantity. By limiting the increasing rate as above, the deterioration of the combustion state of the engine E due to the steep increase in the actual fuel injection quantity can be prevented. On the other hand, since the actual torque actually output becomes smaller than the target torque by the limitation of the increasing rate, that is, since the torque deficiency is generated, the first assist torque corresponding to the deficiency is calculated such that the electric motor 20 outputs the torque corresponding to the deficiency.

Further, in the oil-pressure pump driving device 2, the combustion state of the engine E deteriorates by the change in the actual fuel injection quantity, and this decreases the output torque of the engine E. The assist torque calculating block 40 has a function of: estimating a reduced amount of the output torque reduced due to, for example, the deterioration of the combustion state of the engine E by the change in the actual fuel injection quantity; and calculating a second assist torque (change torque) such that the electric motor 20 compensates the reduced output torque. For calculating the second assist torque, the assist torque calculating block 40 includes a torque change estimating portion 45, a second assist torque calculating portion 46, and a target assist torque calculating portion 47.

Based on the calculated actual revolution speed and the calculated actual fuel injection quantity, the torque change estimating portion 45 estimates a change amount of the torque output from the engine E. The combustion state of the engine E deteriorates by the change in the actual fuel injection quantity, and this causes a response delay of the output torque. The combustion state of the engine E changes for each cycle, and the deterioration of the combustion state of the engine E is improved as the number of combustion operations increases. The larger the actual revolution speed is, the larger the number of combustion operations per unit time is. Therefore, the deterioration of the combustion state of the engine E is improved quickly, and the decrease in the torque of the engine E is made small.

Figure 4:
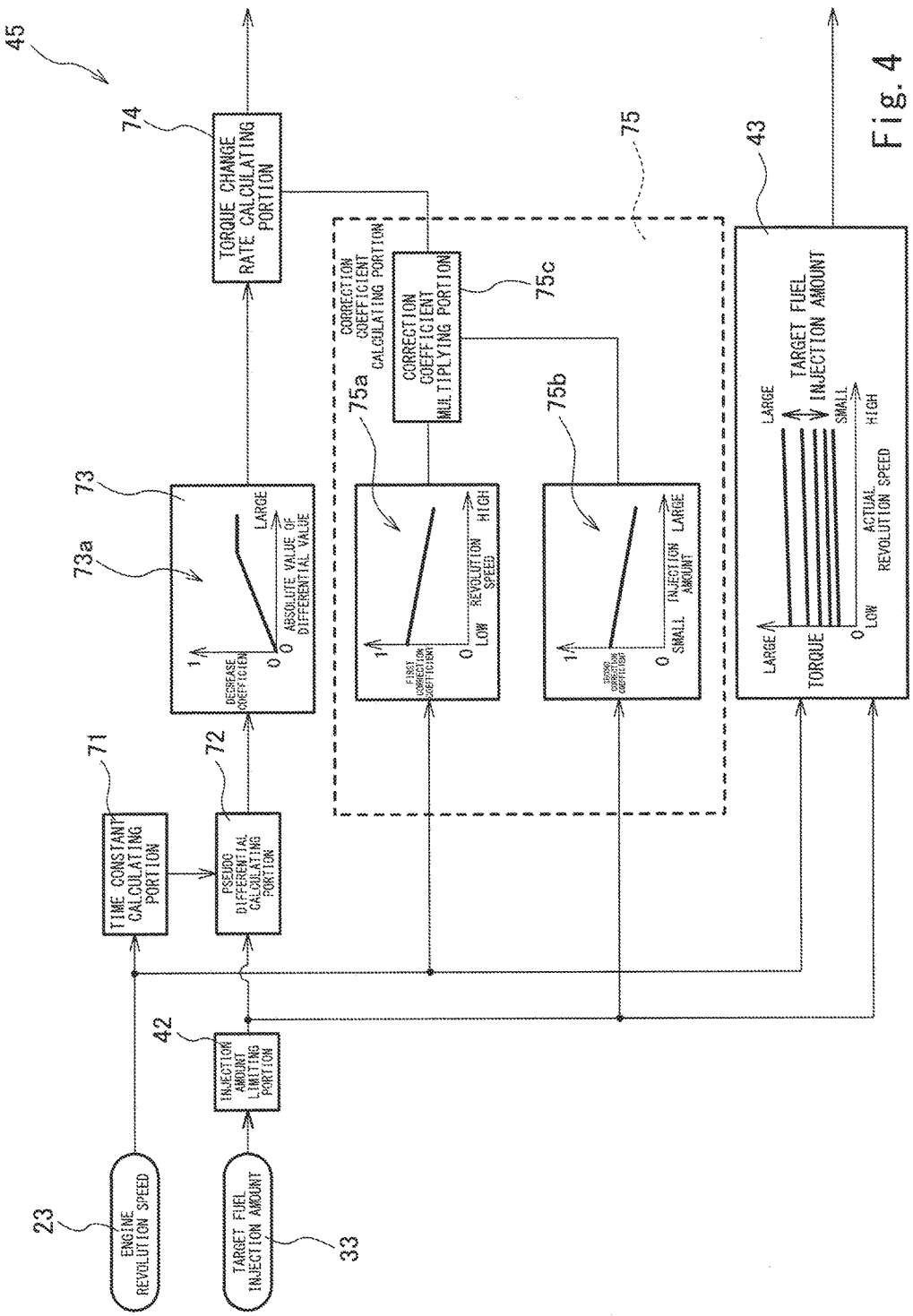
FIG. 4 is a functional block diagram showing a part of the assist torque block of FIG. 3 for detailed explanations.

In view of the characteristic of the output torque of the engine E whose combustion state changes for each cycle, the torque change estimating portion 45 calculates the decrease in the output torque per unit revolution speed (preferably, per cycle). In the present embodiment, the torque change estimating portion 45 prepares a numerical model of the engine E by a transfer function including a below-described pseudo differential to estimate the change in the output torque of the engine E and changes a time constant of the first-order lag element included in the pseudo differential in accordance with the actual revolution speed. With this, the torque change estimating portion 45 can simulatively calculate the decrease in the output torque per unit revolution speed. Thus, considered in this calculation is that: the larger the actual revolution speed is, the more quickly the combustion state of the engine E improves, and as a result, the torque decrease is suppressed; and the smaller the actual revolution speed is, the more slowly the combustion state of the engine E improves, and as a result, the torque decrease becomes large. To be specific, the characteristic of the output torque of the engine E in which the response delay of the torque changes in accordance with the actual revolution speed can be estimated by the above-described transfer function. It should be noted that the calculation by the torque change estimating portion 45 is performed at predetermined intervals. The torque change estimating portion 45 that estimates the change amount of the output torque as above will be explained in more detail also in reference to FIG. 4 in addition to FIG. 3.

As functional portions configured to estimate the change in the output torque, the torque change estimating portion 45 includes a time constant calculating portion 71, a pseudo differential calculating portion 72, a torque change coefficient calculating portion 73, a torque differ ratio calculating portion 74, a correction coefficient calculating portion 75, and a torque change amount calculating portion 76. The time constant calculating portion 71 calculates the actual revolution speed based on a signal from the revolution speed sensor 23 and further calculates the time constant from the actual revolution speed by using a time constant map. In the present embodiment, the time constant map is a map in which the time constant and the actual revolution speed are associated with each other. A correspondence relation between the time constant and the actual revolution speed in the time constant map is set based on data obtained by experiments or the like and differs depending on displacement, accessories, (turbocharger, EGR, etc.), structures (diameters and lengths of pipes, etc.), etc. of the engine E. To be specific, the above correspondence relation differs depending on the type of the engine E and is set for each type of engine E in reference to results of experiments. It should be noted that the above correspondence relation may be set for each product, not for each type. The time constant calculated by the time constant calculating portion 71 is used by the pseudo differential calculating portion 72 together with the actual fuel injection quantity for calculating a differential value of the actual fuel injection quantity.

The pseudo differential calculating portion 72 calculates the differential value of the actual fuel injection quantity by the transfer function that is the numerical model of the engine E. It should be noted that regarding the engine E, the fuel injection quantity and the torque correspond to each other, and the differential value (corresponding to a change rate of the actual fuel injection quantity per unit revolution speed) of the actual fuel injection quantity corresponds to a differ ratio of the torque. The pseudo differential calculating portion 72 will be explained in more detail. The transfer function of the pseudo differential calculating portion 72 includes the pseudo differential (also called an inexact differential) including the first-order lag element. The pseudo differential calculating portion 72 calculates the differential value of the actual fuel injection quantity by using the transfer function. In the present embodiment, the pseudo differential is represented by Formula (1) below where s denotes a Laplace variable, $T_D$ denotes a differential gain, and T denotes a time constant.

Formula (1)

$$M(s) = \frac{s \cdot T_D}{1 + s \cdot T} \quad (1)$$

As above, the differential value of the actual fuel injection quantity is calculated by the pseudo differential including the first-order lag element. With this, a value (i.e., the differential value of the actual fuel injection quantity) which takes into consideration the response delay caused due to the deterioration of the combustion state and corresponds to the differ ratio of the output torque is calculated. Further, the time constant calculated by the time constant calculating portion 71 is used as the time constant T of the first-order lag element included in the pseudo differential. To be specific, the pseudo differential calculating portion 72 changes the time constant in each calculation to calculate the differential value of the actual fuel injection quantity. As above, by calculating the time constant based on the actual revolution speed and changing the time constant in each calculation, the differ ratio of the output torque per unit revolution speed (preferably, per cycle) can be simulatively calculated. The differential value of the actual fuel injection quantity calculated as above corresponds to the differ ratio of the output torque of the engine E per unit revolution speed and is used for calculating a below-described torque change coefficient by the torque change coefficient calculating portion 73.

The torque change coefficient calculating portion 73 calculates the torque change coefficient based on the differential value of the actual fuel injection quantity, the differential value being calculated by the pseudo differential calculating portion 72. The torque change coefficient is a coefficient which shows a degree of the change in the torque with respect to the actual torque. First, the torque change coefficient calculating portion 73 calculates an absolute value of the differential value of the actual fuel injection quantity. Next, the torque change coefficient calculating portion 73 calculates the torque change coefficient from the absolute value of the differential value of the actual fuel injection quantity by using a torque change coefficient map 73a shown in FIG. 4. The torque change coefficient map 73a is a map in which the absolute value of the differential value of the actual fuel injection quantity and the torque change coefficient are associated with each other. For example, the torque change coefficient map 73a is set such that the torque change coefficient increases as the absolute value of the differential value increases. In the present embodiment, a correspondence relation between the absolute value of the differential value of the actual fuel injection quantity and the torque change coefficient in the torque change coefficient map 73a is set based on data obtained by experiments or the like and is set for each type of engine E as with the time constant map. It should be noted that the correspondence relation between the absolute value of the differential value of the actual fuel injection quantity and the torque change coefficient does not necessarily have to be the correspondence relation shown in FIG. 4. The torque change coefficient calculating portion 73 calculates the torque change coefficient based on the torque change coefficient map 73a and the absolute value of the differential value of the actual fuel injection quantity, and the calculated torque change coefficient is used for calculating a torque differ ratio by the torque differ ratio calculating portion 74.

The torque differ ratio is a value showing a rate of the torque which changes (specifically, decreases) in accordance with the change in the combustion state to the actual torque output when the actual fuel injection quantity of fuel is injected to the engine E. The torque change coefficient and the torque differ ratio basically correspond to each other. The torque change coefficient is a value set so as to be uniquely derived from the absolute value of the differential value of the actual fuel injection quantity. On the other hand, the torque differ ratio is influenced by not only the absolute value (i.e., the torque change coefficient) of the differential value of the actual fuel injection quantity but also the actual revolution speed and the actual fuel injection quantity. For example, when the engine E has an exhaust turbo function, an intake delay increases by the turbo in a low rotation range, and this causes the decrease in the output torque. In order to take such phenomenon into consideration, the torque differ ratio is obtained by correcting the torque change coefficient calculated by the torque change coefficient calculating portion 73, and a correction coefficient for this correction is calculated by a correction coefficient calculating portion 75.

The correction coefficient calculating portion 75 calculates the correction coefficient based on the actual fuel injection quantity calculated by the injection quantity limiting portion 42 and the actual revolution speed. The correction coefficient is a coefficient for correcting the torque change coefficient in accordance with the actual revolution speed and the actual fuel injection quantity, the torque change coefficient being calculated by the torque change coefficient calculating portion 73. Explanations will be made in more detail. The correction coefficient calculating portion 75 calculates a first correction coefficient from the actual revolution speed by using a first correction coefficient map 75a shown in FIG. 4 and calculates a second correction coefficient from the actual fuel injection quantity by using a second correction coefficient map 75b shown in FIG. 4. The first correction coefficient map 75a is a map in which the actual revolution speed and the first correction coefficient are associated with each other. The second correction coefficient map 75b is a map in which the actual fuel injection quantity and the second correction coefficient are associated with each other. Each of the correction coefficient maps 75a and 75b is set such that, for example, the correction coefficient decreases as the actual revolution speed or the actual fuel injection quantity increases. It should be noted that each of the two correction coefficient maps 75a and 75b is set based on data obtained from experiments or the like and is set for each type of engine E as with the other maps. Further, the correspondence relation between the actual revolution speed and the first correction coefficient and the correspondence relation between the actual fuel injection quantity and the second correction coefficient do not necessarily have to be the respective correspondence relations shown in FIG. 4.

In the correction coefficient calculating portion 75, a correction coefficient multiplying portion 75c multiplies the calculated first and second correction coefficients together to obtain a torque correction coefficient. The calculated torque correction coefficient is used together with the torque change coefficient for calculating the torque differ ratio by the torque differ ratio calculating portion 74.

The torque differ ratio calculating portion 74 calculates the torque differ ratio based on the torque change coefficient calculated by the torque change coefficient calculating portion 73 and the correction coefficient calculated by the correction coefficient calculating portion 75. As described above, the torque differ ratio is a value showing a rate of the torque which changes (increases or decreases) in accordance with, for example, the deterioration of the combustion state to the actual torque. The torque differ ratio calculating portion 74 multiplies the calculated torque change coefficient and the calculated correction coefficient together to obtain the torque differ ratio. The calculated torque differ ratio is used together with the actual torque for calculating a torque change amount by the torque change amount calculating portion 76.

The torque change amount calculating portion 76 calculates the torque change amount of the engine E based on the torque differ ratio calculated by the torque differ ratio calculating portion 74 and the actual torque calculated by the actual torque calculating portion 43, the torque change amount being caused due to the change in the actual fuel injection quantity. The torque change amount is a change amount (i.e., a torque decrease amount or a torque increase amount) of the torque which changes in accordance with the combustion state of the engine E when the fuel of the actual fuel injection quantity calculated by the injection quantity limiting portion 42 is injected to the engine E. The torque change amount calculating portion 76 multiplies the torque differ ratio and the actual torque calculating portion 43 together to obtain the torque change amount. As above, the torque change estimating portion 45 estimates the torque change amount. The estimated torque change amount is used for calculating the second assist torque by the second assist torque calculating portion 46.

In order that the output torque of the electric motor 20 compensates the deficiency of the torque which has decreased in accordance with the change in the actual fuel injection quantity, the second assist torque calculating portion 46 (change torque calculating portion) calculates the second assist torque (change torque) corresponding to the deficiency of the torque. This calculation method will be explained in detail. The second assist torque calculating portion 46 first determines whether or not the differential value of the actual fuel injection quantity is less than zero, the differential value being calculated by the pseudo differential calculating portion 72. When it is determined that the differential value of the actual fuel injection quantity is less than zero, the second assist torque calculating portion 46 selects zero as a multiplication coefficient. When it is determined that the differential value of the actual fuel injection quantity is zero or more, the second assist torque calculating portion 46 selects a predetermined value (in the present embodiment, one) as the multiplication coefficient. Further, the second assist torque calculating portion 46 multiplies the multiplication coefficient and the torque change amount together to obtain a multiplication result that is the second assist torque. Therefore, when the differential value is less than zero, the second assist torque becomes zero. When the differential value is zero or more, the second assist torque becomes the torque change amount. The second assist torque calculated as above is used together with the first assist torque for calculating the target assist torque by the target assist torque calculating portion 47, the target assist torque being to be output from the electric motor 20.

The target assist torque calculating portion 47 shown in FIG. 3 calculates the target assist torque based on the first assist torque and the second assist torque, the target assist torque being output from the electric motor 20. To be specific, the target assist torque calculating portion 47 adds the first assist torque and the second assist torque to obtain the target assist torque. The obtained target assist torque is used for calculating a limiting assist torque by a torque limiting block 50, the limiting assist torque being actually output from the electric motor 20.

The torque limiting block 50 shown in FIG. 2 limits the output torque of the electric motor 20 such that the output torque does not exceed a limit value. The torque limiting block 50 includes a first torque limiting portion 51 and a torque deficiency calculating portion 52. The first torque limiting portion 51 has a limiting function of limiting the target assist torque, calculated by the assist torque calculating block 40, to a predetermined virtual allowable value L1 or less. Specifically, when the target assist torque is less than the virtual allowable value L1, the first torque limiting portion 51 does not limit the target assist torque and sets the target assist torque as an output value. When the target assist torque is the virtual allowable torque L1 or more, the first torque limiting portion 51 sets the virtual allowable torque L1 as the output value. The virtual allowable torque L1 is a preset value and is a value smaller than a below-described maximum allowable torque L2. The obtained output value is used for calculating the torque deficiency by the torque deficiency calculating portion 52, the torque deficiency being caused by limiting the target assist torque. The torque deficiency calculating portion 52 calculates the torque deficiency (in the present embodiment, the deficiency is shown by a positive value) based on the output value of the first torque limiting portion 51 and the target assist torque, the torque deficiency being obtained by subtracting the output value from the target assist torque. Explanations will be made in more detail. The torque deficiency calculating portion 52 subtracts the output value from the target assist torque. With this, the torque deficiency is obtained. The obtained torque deficiency is used by the tilting angle control block 60 for calculating the tilting angle to be reduced.

The tilting angle control block 60 controls the tilting angle of the swash plate 17b of the oil-pressure pump 17. The tilting angle control block 60 includes a reduced power calculating portion 61, a reduced flow rate calculating portion 62, a set flow rate calculating portion 63, an actual flow rate calculating portion 64, a tilting angle calculating portion 65, and a tilting angle control portion 66. Based on the torque deficiency calculated by the torque deficiency calculating portion 52 and the actual revolution speed, the reduced power calculating portion 61 calculates the power of the oil-pressure pump 17 which power is to be reduced, that is, a reduced power. Explanations will be made specifically. The reduced power calculating portion 61 multiplies the torque deficiency by the actual revolution speed to obtain the reduced power. The obtained reduced power is used by the reduced flow rate calculating portion 62 for calculating the ejection flow rate to be reduced.

Based on the ejection pressure of the oil-pressure pump 17 which pressure is calculated based on a signal from the ejection pressure sensor 24 and the reduced power calculated by the reduced power calculating portion 61, the reduced flow rate calculating portion 62 calculates the ejection flow rate of the oil-pressure pump 17 which flow rate is to be reduced, that is, a reduced flow rate. Explanations will be made specifically. The reduced flow rate calculating portion 62 divides the reduced power by the ejection pressure to obtain the reduced flow rate. The obtained reduced flow rate is used by the actual flow rate calculating portion 64 for calculating an actual ejection flow rate actually ejected from the oil-pressure pump 17. The actual flow rate calculating portion 64 uses a required flow rate for calculating the actual ejection flow rate, and the required flow rate is calculated by the set flow rate calculating portion 63.

The set flow rate calculating portion 63 calculates the required flow rate that is the ejection flow rate to be ejected from the oil-pressure pump 17. One example of this calculation will be explained. Based on the signals input from the pilot pressure sensors S1 and S2 of the operating tools 111 to 115, the set flow rate calculating portion 63 calculates the pilot pressures output from the operating tools 111 to 115. Next, the set flow rate calculating portion 63 selects the highest pilot pressure among the calculated pilot pressures. Further, the set flow rate calculating portion 63 calculates a specified flow rate based on the selected pilot pressure and a flow rate map. The flow rate map is a map in which the pilot pressure and the specified flow rate are associated with each other. The set flow rate calculating portion 63 calculates the specified flow rate from the flow rate map based on the selected pilot pressure. The specified flow rate is a flow rate ejected from the oil-pressure pump 17 when the actual revolution speed is a predetermined reference revolution speed. The set flow rate calculating portion 63 corrects the calculated specified flow rate by the actual revolution speed to obtain the required flow rate required with respect to the operation amount of the operating tool (111 to 115). The obtained required flow rate is used together with the reduced flow rate by the actual flow rate calculating portion 64 for calculating the actual ejection flow rate, the reduced flow rate being calculated by the reduced flow rate calculating portion 62.

Based on the required flow rate and the reduced flow rate, the actual flow rate calculating portion 64 calculates the actual ejection flow rate actually ejected from the oil-pressure pump 17. Explanations will be made specifically. The actual flow rate calculating portion 64 subtracts the reduced flow rate from the required flow rate to obtain the actual ejection flow rate. The obtained actual ejection flow rate is used by the tilting angle calculating portion 65 for calculating the tilting angle of the swash plate 17b. The tilting angle calculating portion 65 calculates a tilting angle command value that is the tilting angle set for ejecting the pressure oil from the oil-pressure pump 17 at the actual ejection flow rate. Regarding the oil-pressure pump 17, the tilting angle and an ejection volume correspond to each other. Based on the tilting angle and the actual revolution speed, the actual flow rate calculating portion 64 can calculate the actual ejection flow rate ejected from the oil-pressure pump 17. Therefore, the tilting angle calculating portion 65 can calculate the tilting angle command value based on the actual ejection flow rate and the actual revolution speed. The tilting angle calculating portion 65 calculates the tilting angle command value based on the actual revolution speed and the actual ejection flow rate, the actual revolution speed being calculated based on the signal from the revolution speed sensor 23. The calculated tilting angle command value is used by the tilting angle control portion 66 when determining the tilt signal.

The tilting angle control portion 66 determines the tilt signal by which the tilting angle adjuster 19 operates such that the tilting angle of the swash plate 17b becomes the tilting angle command value. Further, the tilting angle control portion 66 outputs the determined tilt signal to the tilting angle adjusting valve 19a to control the servo mechanism 19b such that the tilting angle of the swash plate 17b becomes the tilting angle command value. With this, the swash plate 17b can be inclined at the tilting angle command value, and the pressure fluid can be ejected from the oil-pressure pump 17 at the calculated actual ejection flow rate. Thus, for example, the output torque of the oil-pressure pump 17 is reduced by the torque deficiency generated since the torque limiting block 50 limits the output torque of the electric motor 20, and this reduces a load on the engine E. As a result, the revolution speed of the engine E is prevented from steeply decreasing.

On the other hand, in the oil-pressure driving system 1, the tilting angle adjuster 19 mechanically reduces the actual ejection flow rate of the oil-pressure pump 17. Therefore, the response delay with respect to the tilt signal occurs in the tilting angle adjuster 19. By the occurrence of the response delay, the actual ejection flow rate of the oil-pressure pump 17 cannot be reduced in accordance with the tilt signal, so that the output torque of the oil-pressure pump 17 cannot be reduced. On this account, the control device 30 includes a torque correction block 80 in addition to the three blocks 40, 50, and 60.

The torque correction block 80 calculates an excess or deficiency of a reduced torque, the excess or deficiency being generated by the response delay, and corrects the output value such that the excess or deficiency is compensated by the output torque of the electric motor 20. The torque correction block 80 includes a reduced torque estimating portion 81, an excess/deficiency calculating portion 82, and a torque correcting portion 83. The reduced torque estimating portion 81 estimates the reduced torque based on the torque deficiency calculated by the torque deficiency calculating portion 52, the reduced torque being a torque reduced at the oil-pressure pump 17 by the tilting angle control executed by the tilting angle control block 60. The reduced torque estimating portion 81 estimates the reduced torque (in the present embodiment, the torque to be reduced is shown by a positive value) by using a transfer function that is a numerical model of the oil-pressure pump 17. The transfer function of the reduced torque estimating portion 81 includes a first-order lag element, and the first-order lag element is set based on data obtained by experiments conducted in advance or the like. The reduced torque estimating portion 81 estimates the reduced torque of the oil-pressure pump 17 by using such transfer function, the reduced torque being a torque reduced by the tilting angle control performed by the tilting angle control block 60. The estimated reduced torque is used together with the torque deficiency by the excess/deficiency calculating portion 82 for calculating the excess or deficiency of the reduced torque, the torque deficiency being calculated by the torque deficiency calculating portion 52.

The excess/deficiency calculating portion 82 calculates the excess or deficiency of the reduced torque based on the reduced torque estimated by the reduced torque estimating portion 81 and the torque deficiency calculated by the torque deficiency calculating portion 52. Explanations will be made in more detail. The excess/deficiency calculating portion 82 subtracts the reduced torque from the torque deficiency. With this, the excess or deficiency of the reduced torque is calculated. The calculated excess or deficiency is used by the torque correcting portion 83 for correcting the output value calculated by the first torque limiting portion 51.

Based on the excess or deficiency calculated by the excess/deficiency calculating portion 82 and the output value calculated by the first torque limiting portion 51, the torque correcting portion 83 corrects the output value so as to compensate the excess or deficiency of the reduced torque. Explanations will be made in more detail. The torque correcting portion 83 corrects the output value by adding the excess or deficiency to the output value, and thus, obtains a corrected torque by this correction. The obtained corrected torque is used by a second torque limiting portion 53 of the torque limiting block 50 so as to be limited to not more than the maximum allowable torque L2 of the electric motor 20.

The second torque limiting portion 53 has a function of limiting the corrected torque to the maximum allowable torque L2 or less. The maximum allowable torque L2 is a maximum torque that can be output by the electric motor 20. The second torque limiting portion 53 will be explained in more detail. When the corrected torque is less than the maximum allowable torque L2, the second torque limiting portion 53 sets the corrected torque as a command torque. When the corrected torque is the maximum allowable torque L2 or more, the second torque limiting portion 53 sets the maximum allowable torque L2 as the command torque. The command torque is used by a drive control portion 54 of the torque limiting block 50. The drive control portion 54 controls the inverter 22 to drive the electric motor 20 such that the electric motor 20 outputs the command torque.

When the revolution speed of the engine E decreases by the increase in the load of the oil-pressure pump 17, and the target fuel injection quantity of the engine E is increased for compensating the reduced revolution speed, the control device 30 configured as above drives the electric motor 20 to assist the engine E. At this time, when the required assist torque increases, and this increases the load of the electric motor 20, the output torque of the oil-pressure pump 17 is reduced by reducing the tilting angle of the swash plate 17b. The following will explain the operations of the oil-pressure pump driving device 2 when any one of the operating tools 111 to 115 is operated, and this increases the load of the oil-pressure pump 17.

When the control valve 18 operates by operating the operating tool, the oil-pressure pump 17 is switched from an unloaded state to a loaded state, and a large load acts on the oil-pressure pump 17. When the load of the oil-pressure pump 17 increases, the actual revolution speed of the engine E decreases. In the oil-pressure pump driving device 2, the target revolution speed determining portion 31 determines the target revolution speed in advance, and the revolution speed difference calculating portion 32 calculates the difference between the actual revolution speed and the target revolution speed. When the actual revolution speed decreases, and this generates the difference between the actual revolution speed and the target revolution speed in the engine E, the target fuel injection quantity calculating portion 33 calculates the target fuel injection quantity based on this difference. The calculated target fuel injection quantity is used by the assist torque calculating block 40 together with the actual revolution speed, and the assist torque calculating block 40 calculates the target assist torque based on the target fuel injection quantity and the actual revolution speed.

The calculation by the assist torque calculating block 40 will be simply explained. First, the injection quantity limiting portion 42 gradually increases the actual fuel injection quantity to the target fuel injection quantity in proportion to time while limiting the increasing rate (or increase amount) of the target fuel injection quantity to less than the predetermined value. It should be noted that when the increasing rate is less than the predetermined value, the target fuel injection quantity is not limited. Based on the actual fuel injection quantity and the actual revolution speed, the actual torque calculating portion 43 calculates the actual torque output from the engine E. On the other hand, the target torque calculating portion 41 calculates the target torque based on the target fuel injection quantity and the actual revolution speed. Next, based on the target torque and the actual torque, the first assist torque calculating portion 44 calculates the first assist torque that is the torque deficiency obtained by subtracting the actual torque from the target torque.

As above, the oil-pressure pump driving device 2 can limit the increasing rate (or increase amount) of the actual fuel injection quantity to suppress the steep change in the actual fuel injection quantity. With this, the deterioration of the combustion state of the engine E can be suppressed. Thus, the decrease in the torque of the engine E can be suppressed, and the fuel efficiency of the engine E can be improved. The assist torque calculating block 40 calculates the first assist torque in advance, the first assist torque being the torque deficiency generated by limiting the fuel injection quantity. Even when the actual fuel injection quantity is limited, the torque output from the entire oil-pressure pump driving device 2 can be made close to the target torque by the output of the first assist torque from the electric motor 20. With this, the decrease in the torque output from the entire oil-pressure pump driving device 2 can be suppressed. As above, the oil-pressure pump driving device 2 performs the torque adjustment by estimating the change amount of the output torque in advance and causing the electric motor 20 to output the torque. Thus, the excessive decrease in the revolution speed of the engine E can be suppressed as compared to a case where the torque adjustment is performed in accordance with a revolution speed deviation. With this, the decrease in the fuel efficiency of the engine E due to the excessive decrease in the revolution speed of the engine E can be suppressed.

In parallel with the calculation of the first assist torque, the assist torque calculating block 40 calculates the torque change coefficient in the torque change estimating portion 45. The torque change estimating portion 45 calculates the torque change coefficient based on the actual revolution speed and the actual fuel injection quantity and further calculates the torque change amount. Explanations will be made in detail. The time constant calculating portion 71 calculates the time constant from the actual revolution speed by using the time constant map 71a, and the pseudo differential calculating portion 72 calculates the differential value of the actual fuel injection quantity by using the calculated time constant. Next, the torque change coefficient calculating portion 73 calculates the absolute value of the differential value of the actual fuel injection quantity and further calculates the torque change coefficient from the absolute value of the differential value of the actual fuel injection quantity by using the torque change coefficient map 73a.

The pseudo differential calculating portion 72 changes the time constant in each calculation to calculate the differ ratio of the output torque per unit revolution speed with respect to the actual torque and calculates the change amount of the output torque per unit revolution speed based on the differ ratio and the actual torque. As above, the change in the output torque is calculated based on not the time unit but the revolution speed unit. Therefore, the decrease in the output torque of the engine E can be accurately estimated as compared to a case where the change in the output torque is calculated based on the time unit. With this, the excessive decrease in the revolution speed due to the decrease in the output torque by the deterioration of the combustion can be prevented, and the decrease in the fuel efficiency of the engine E due to the excessive decrease in the revolution speed can be suppressed. Since the pseudo differential calculating portion 72 changes the time constant in accordance with the actual revolution speed, a torque decrease coefficient can be calculated in detail. With this, the torque change estimating portion 45 can more accurately estimate the torque change coefficient and the torque change amount.

In parallel with the calculation of the torque change coefficient by the torque change coefficient calculating portion 73, the correction coefficient calculating portion 75 calculates the correction coefficient. Explanations will be made in detail. The correction coefficient calculating portion 75 calculates the first correction coefficient based on the calculated actual revolution speed, calculates the second correction coefficient based on the calculated actual fuel injection quantity, and further calculates the correction coefficient based on the first correction coefficient and the second correction coefficient. The torque differ ratio calculating portion 74 calculates the torque differ ratio based on the calculated correction coefficient and the calculated torque change coefficient, and the torque change amount calculating portion 76 calculates the torque change amount based on the torque differ ratio and the actual torque. As above, the torque change estimating portion 45 estimates the torque change amount, and the estimated torque change amount is used by the second assist torque calculating portion 46. The second assist torque calculating portion 46 calculates the second assist torque from the torque change amount.

As above, in the assist torque calculating block 40, the torque change estimating portion 45 estimates in advance the change amount of the output torque changed by, for example, the deterioration of the combustion state of the engine E due to the change in the actual fuel injection quantity, and the second assist torque corresponding to the calculated change amount can be calculated. To be specific, when the output torque of the engine E changes, the electric motor can output the torque corresponding to this change. With this, when a load is applied to the oil-pressure pump 17, the excessive decrease in the revolution speed due to the decrease in the output torque by the deterioration of the combustion can be prevented, and the decrease in the fuel efficiency of the engine E due to the excessive decrease in the revolution speed can be suppressed.

When the differential value of the actual fuel injection quantity is zero or more, the second assist torque calculating portion 46 selects the predetermined value (=1) as the multiplication coefficient. The second assist torque calculating portion 46 multiplies the multiplication coefficient by the torque change amount to obtain the second assist torque. The target assist torque calculating portion 47 adds the calculated first assist torque and the calculated second assist torque to obtain the target assist torque. The calculated target assist torque is used by the torque limiting block 50 for determining the output torque of the electric motor 20 and the tilting angle of the swash plate 17b.

Figure 5:
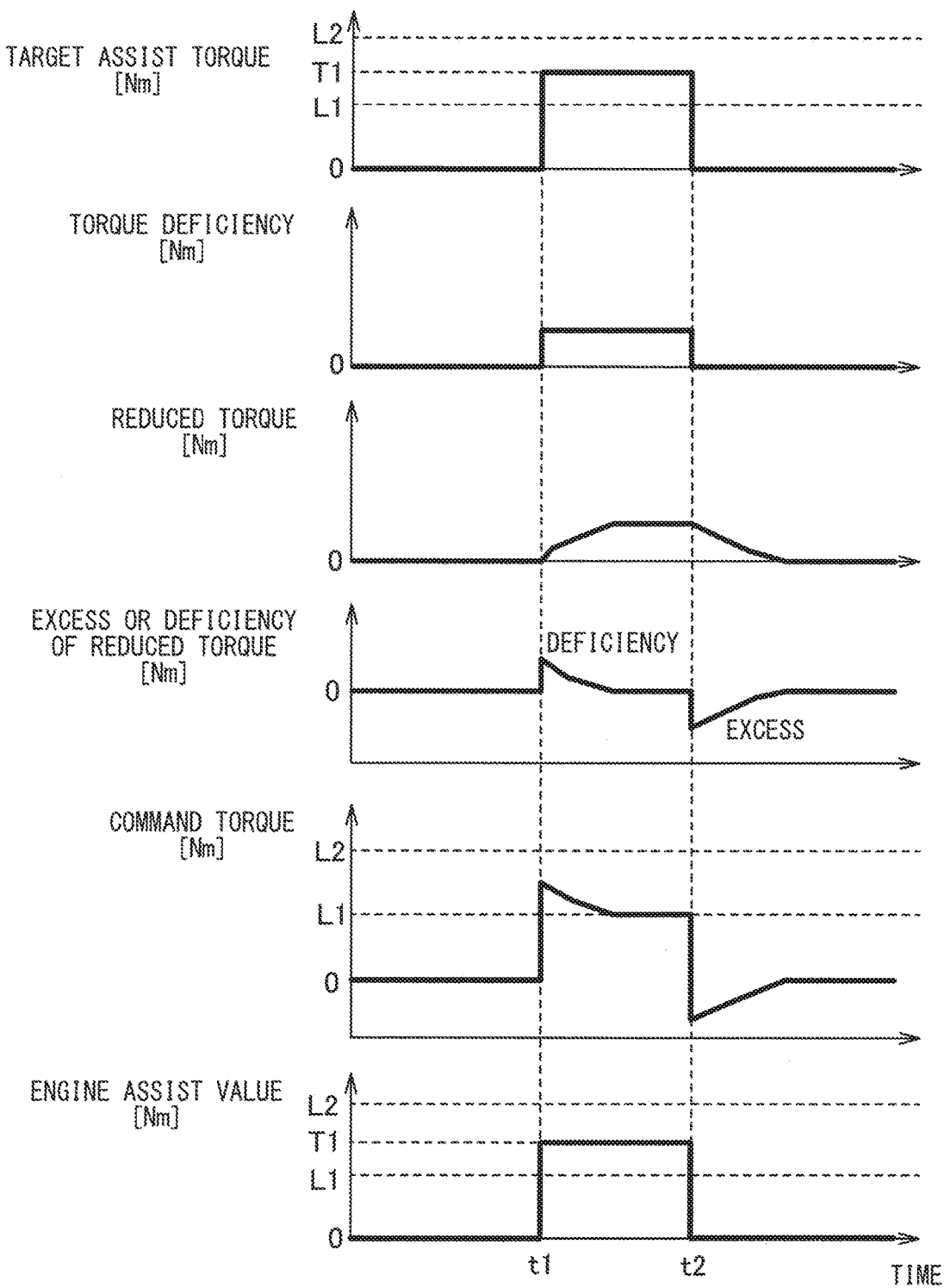
FIG. 5 is a graph showing time-lapse changes of various values when an oil-pressure pump driving system of FIG. 1 drives in a state where a target assist torque is a maximum allowable torque or less.

The following will explain a case where the calculated target torque changes with time as shown in a graph of the target assist torque in FIG. 5. FIG. 5 shows time-lapse changes of the target assist torque, the torque deficiency, the reduced torque, the excess or deficiency, the command torque, an engine assist value in this order from the top. In FIG. 5, a horizontal axis denotes a time, and a vertical axis denotes various values.

The target assist torque increases to a torque T1 (>L1) at a time t1 at which any one of the operating tools 111 to 115 is operated. The target assist torque is maintained constant until a time t2. Then, the operating tool (111 to 115) that has been operated is returned at the time t2, and the target assist torque becomes zero. In the torque limiting block 50, first, the first torque limiting portion 51 calculates the output value obtained by limiting the target assist torque to the virtual allowable value L1 or less. The torque deficiency calculating portion 52 subtracts the output value from the target assist torque to obtain the torque deficiency (see the times t1 and t2 in the graph of the torque deficiency in FIG. 5). The reduced power calculating portion 61 of the tilting angle control block 60 calculates the reduced power based on the torque deficiency calculated by the torque deficiency calculating portion 52 and the actual revolution speed. Next, the reduced flow rate calculating portion 62 calculates the reduced flow rate based on the reduced power and the ejection pressure of the oil-pressure pump 17. In addition, the set flow rate calculating portion 63 calculates the specified flow rate and corrects the calculated specified flow rate by the actual revolution speed to obtain the required flow rate. The actual flow rate calculating portion 64 subtracts the reduced flow rate from the calculated required flow rate to obtain the actual ejection flow rate. The tilting angle calculating portion 65 calculates the tilting angle command value based on the calculated actual ejection flow rate and the calculated actual revolution speed in accordance with a relation among the ejection flow rate of the oil-pressure pump 17, the tilting angle, and the revolution speed. Based on this tilting angle command value, the tilting angle control portion 66 determines the tilt signal (current). The tilting angle control portion 66 outputs the determined tilt signal to the tilting angle adjusting valve 19a of the tilting angle adjuster 19 to control the operation of the servo mechanism 19b such that the tilting angle of the swash plate 17b of the oil-pressure pump 17 becomes the tilting angle command value. With this, the swash plate 17b is inclined at the tilting angle corresponding to the tilting angle command value, and this decreases the output torque of the oil-pressure pump 17.

Further, in the oil-pressure driving system 1, in parallel with the tilting angle control by the tilting angle control block 60, the torque correction block 80 calculates the excess or deficiency of the reduced torque, the excess or deficiency being generated by the response delay of the tilting angle control. Explanations will be made in detail. The reduced torque estimating portion 81 of the torque correction block 80 calculates the reduced torque by using the torque deficiency calculated by the torque deficiency calculating portion 52 and the transfer function (see the graph of the reduced torque in FIG. 5). As shown in the graph of the reduced torque in FIG. 5, the reduced torque of the oil-pressure pump 17 gradually increases from the start (time t1) of the tilting angle control and reaches the torque deficiency after a predetermined time. When the operating tool (111 to 115) is returned to a neutral position (time t2), the reduced torque of the oil-pressure pump 17 gradually decreases such that the tilting angle is returned to the tilting angle command value corresponding to the required flow rate. As above, the response of the reduced torque delays with respect to the tilt signal. When the reduced torque is estimated, the excess/deficiency calculating portion 82 subtracts the reduced torque from the torque deficiency to obtain the excess or deficiency of the reduced torque (see a graph of an excess or deficiency of the reduced torque in FIG. 5). As shown in the graph of the excess or deficiency of the reduced torque in FIG. 5, the deficiency immediately after the operating tool (111 to 115) is operated is the largest, and the deficiency decreases with time and becomes zero soon. After that, when the operating tool (111 to 115) is returned to the neutral position, the reduced torque becomes excessive. It should be noted that the excessive reduced torque also decreases with time and becomes zero soon.

To compensate the excess or deficiency of the reduced torque which changes as above, the torque correcting portion 83 adds the excess or deficiency of the reduced torque to the output value of the first torque limiting portion 51 to obtain the corrected torque. The second torque limiting portion 53 sets the command torque such that the corrected torque is limited to not more than the maximum allowable torque L2 of the electric motor 20 (see a graph of the command torque in FIG. 5). The drive control portion 54 controls the inverter 22 such that the electric motor 20 outputs the set command torque.

As above, in the oil-pressure driving system 1, the tilting angle is controlled, and the electric motor 20 is driven. With this, the target assist torque can be covered by the assist torque of the electric motor 20 and the reduced torque of the oil-pressure pump 17. To be specific, the corrected torque is output from the electric motor 20, and the output torque of the oil-pressure pump 17 is reduced by the reduced torque. With this, the engine E can be assisted by the target assist torque. Therefore, the engine assist value obtained by adding the corrected torque and the reduced torque (reduced amount; positive value) substantially coincides with the target assist torque as shown in the graph of the engine assist value in FIG. 5 (see a graph of a total torque in FIG. 5).

As above, in the oil-pressure driving system 1, when the target assist torque becomes the virtual allowable value L1 or more, the output torque of the oil-pressure pump 17 is reduced by adjusting the tilting angle of the swash plate 17b. Therefore, before the revolution speed of the engine E actually decreases steeply, the output torque of the oil-pressure pump 17 can be reduced in accordance with the increase in the target assist torque. On this account, the revolution speed decreases, and the tilting angle control can be performed. Thus, the decrease in the revolution speed can be suppressed as compared to a conventional technology in which the output torque of the oil-pressure pump 17 is reduced based on a revolution speed difference. As above, the oil-pressure driving system 1 can reduce the output torque of the oil-pressure pump 17 so as to prevent the revolution speed of the engine E from excessively decreasing. With this, even when a large load is applied to the oil-pressure pump 17, the revolution speed of the engine E can be maintained in the vicinity of the target revolution speed. Therefore, the engine E can be driven in a satisfactory operation range, and the deterioration of the fuel efficiency of the engine E can be prevented.

In the oil-pressure driving system 1, the excess or deficiency of the reduced torque due to the response delay caused by the tilting angle control can be compensated by the increase or decrease in the output torque of the electric motor 20. With this, the deficiency of the assist torque due to the response delay can be suppressed, and the decrease in the revolution speed of the engine E can be suppressed.

Figure 6:
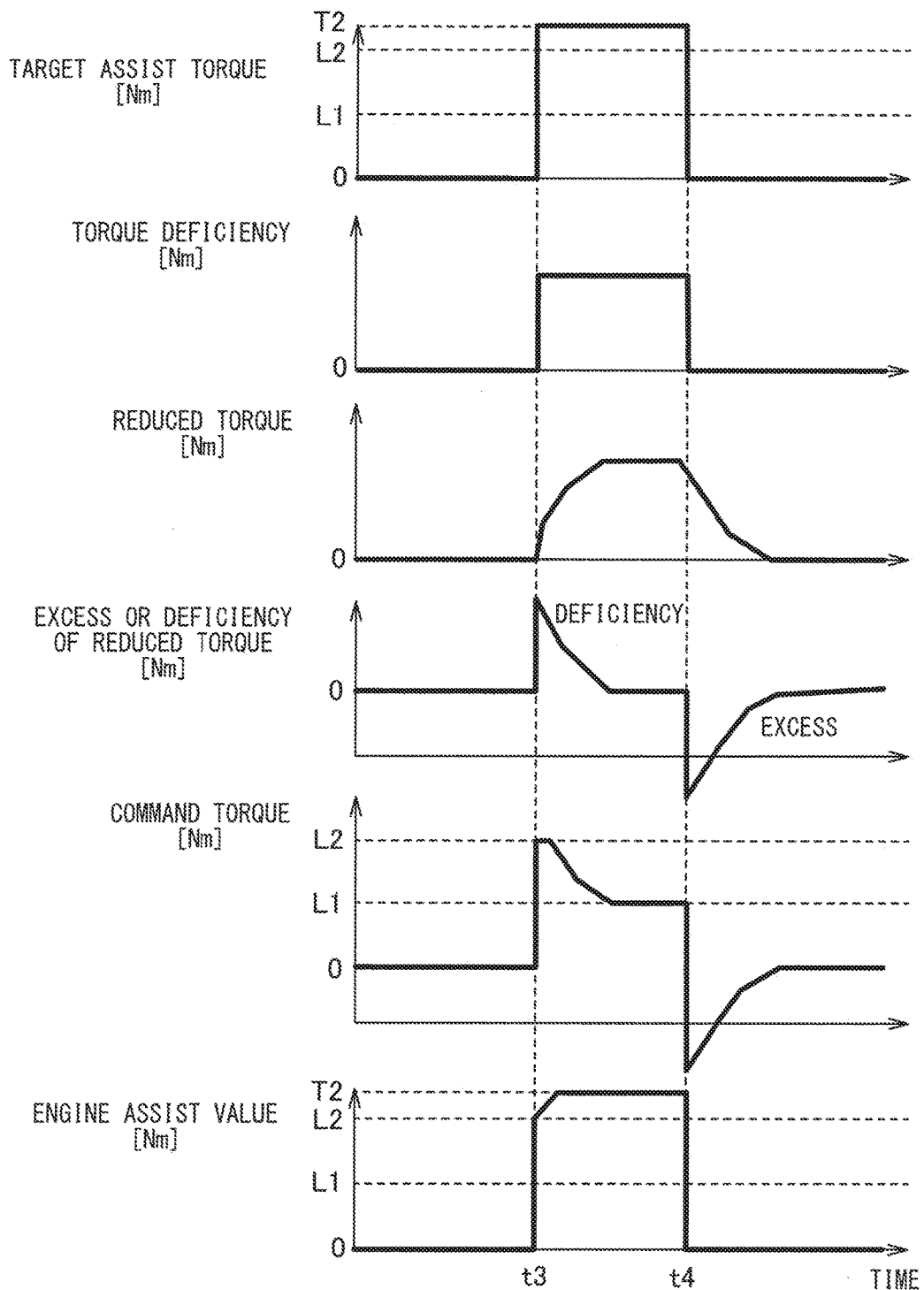
FIG. 6 is a graph showing time-lapse change of various values when the oil-pressure pump driving system of FIG. 1 drives in a state where the target assist torque is the maximum allowable torque or more.

Next, a case where the target assist torque calculated when the load of the oil-pressure pump 17 increases is the maximum allowable torque L2 or more will be explained in reference to FIG. 6. As with FIG. 5, FIG. 6 shows time-lapse changes of the target assist torque, the torque deficiency, the reduced torque, the excess or deficiency, the command torque, and a system torque in this order from the top. In FIG. 5, a horizontal axis denotes a time, and a vertical axis denotes various values.

As shown in a graph of the target assist torque in FIG. 6, in the assist torque calculating block 40, the target assist torque increases to a torque T2 (>L2) at a time t3 at which any one of the operating tools 111 to 115 is operated. The target assist torque is maintained constant until a time t4. Then, the operating tool (111 to 115) that has been operated is returned at the time t4, and the target assist torque becomes zero. In the torque limiting block 50, as with a case where the target assist torque is the virtual allowable value L1 or less, first, the first torque limiting portion 51 calculates the output value obtained by limiting the target assist torque to the virtual allowable value L1 or less, and the torque deficiency calculating portion 52 calculates the torque deficiency. The tilting angle control block 60 calculates the tilting angle command value based on the calculated torque deficiency. Further, the tilting angle control block 60 outputs the tilt signal to the tilting angle adjusting valve 19a based on the tilting angle command value to operate the tilting angle adjuster 19 such that the tilting angle of the swash plate 17b becomes the tilting angle command value.

On the other hand, in the torque correction block 80, the reduced torque estimating portion 81 estimates the reduced torque based on the torque deficiency calculated by the torque deficiency calculating portion 52 (see a graph of the reduced torque of FIG. 6), and the excess/deficiency calculating portion 82 calculates the excess or deficiency of the reduced torque based on the estimated reduced torque (see a graph of the excess or deficiency of the reduced torque in FIG. 6). The torque correcting portion 83 corrects the output value based on the calculated excess or deficiency to obtain the corrected torque. Since the target assist torque is the maximum allowable torque L2 or more, and the response of the tilting angle control delays, the corrected torque calculated immediately after the start of the tilting angle control becomes the maximum allowable torque L2 or more. Therefore, the second torque limiting portion 53 sets the command torque such that the corrected torque is limited to the maximum allowable torque L2 or less (see a graph of the command torque in FIG. 6). The drive control portion 54 controls the operation of the inverter 22 such that the electric motor 20 outputs the set command torque.

In a case where the target assist torque exceeds the maximum allowable torque L2, the output torque of the electric motor 20 is reduced immediately after the start of the tilting angle control by a value obtained by subtracting the maximum allowable torque L2 from the target assist torque. Therefore, the total torque of the oil-pressure driving system 1 becomes slightly smaller than the target assist torque immediately after the start of the tilting angle control but can be set to substantially coincide with the target assist torque (see a graph of the total torque in FIG. 6).

Other Embodiments

In the oil-pressure driving system 1 of the present embodiment, the virtual limit value L1 of the first torque limiting portion 51 is constant. However, the virtual limit value L1 may be a variable value. For example, the control device 30 may detect a state of the battery 25 in accordance with a signal from the battery sensor 26 and change the virtual limit value L1 in accordance with the state of the battery 25. Specifically, the virtual limit value L1 may be reduced in accordance with the decrease in the charge amount of the battery 25 or the decrease in the temperature of the battery 25. By setting the virtual limit value L1 as the variable value as above, a case where the electric motor 20 cannot output the command torque can be prevented. In the present embodiment, the state value of the battery 25 is detected. However, the state value of the inverter 22 may be detected.

In the oil-pressure driving system 1 of the present embodiment, the assist torque calculating block 40 calculates the actual fuel injection quantity and the torque change amount to calculate the target assist torque. However, the target assist torque does not necessarily have to be calculated by such calculation method. For example, the first assist torque may be set as the target assist torque, or the second assist torque may be set as the target assist torque.

Further, a construction machine on which the oil-pressure driving system 1 is mounted is not limited to the hydraulic excavator and may be the other construction machine such as a crane or a dozer. The construction machine on which the oil-pressure driving system 1 is mounted is only required to be a construction machine including an oil-pressure actuator. Furthermore, in the oil-pressure driving system 1, the oil-pressure pump is used as one example of the liquid-pressure pump. However, the liquid-pressure pump is not limited to the oil-pressure pump and is only required to be a pump configured to eject a liquid such as water.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1 oil-pressure driving system
17 oil-pressure pump
17b swash plate
19 tilting angle adjuster
20 electric motor
22 inverter
25 battery
26 battery sensor
30 control device
33 target fuel injection quantity calculating portion
40 assist torque calculating block
41 target torque calculating portion
42 injection quantity limiting portion
43 actual torque calculating portion
44 first assist torque calculating portion (difference torque calculating portion)
45 torque change estimating portion
46 second assist torque calculating portion
47 target assist torque calculating portion
51 first torque limiting portion (target assist torque limiting portion)
52 torque deficiency calculating portion
53 second torque limiting portion (command torque limiting portion)
54 drive control portion
65 tilting angle calculating portion
66 tilting angle control portion
81 reduced torque estimating portion
82 excess/deficiency calculating portion
83 torque correcting portion
111 to 115 operating tool (operating device)

The invention claimed is:

1. A liquid-pressure driving system comprising:
a variable displacement liquid-pressure pump rotated by an output torque of an engine and configured to eject a pressure liquid, an ejection amount of which corresponds to a tilting angle of the liquid-pressure pump;
a tilting angle adjuster configured to adjust the tilting angle of the liquid-pressure pump in accordance with a tilting angle command input to the tilting angle adjuster;
an electric motor configured to assist the output torque of the engine to rotate the liquid-pressure pump; and a control device configured to control the electric motor such that a revolution speed of the engine becomes a preset target engine revolution speed and also control the tilting angle adjuster such that the liquid-pressure pump ejects the pressure liquid at a required flow rate corresponding to an operation amount of an operating device, wherein:

the control device includes a target assist torque calculating portion, a target assist torque limiting portion, a drive control portion, a torque deficiency calculating portion, a tilting angle calculating portion, and a tilting angle control portion;

the target assist torque calculating portion calculates a target assist torque output from the electric motor configured to assist the engine;

the target assist torque limiting portion limits the target assist torque to an output value that is a preset limit value or less;

the drive control portion controls the electric motor such that the electric motor outputs a command torque corresponding to the output value;

the torque deficiency calculating portion calculate a torque deficiency in accordance with the target assist torque and the output value, the torque deficiency being a deficiency;

the tilting angle calculating portion calculates a tilting angle command value by which an output torque of the liquid-pressure pump is reduced by the torque deficiency calculated by the torque deficiency calculating portion; and the tilting angle control portion outputs a tilting angle command to the tilting angle control device to control the tilting angle control device, the tilting angle command corresponding to the tilting angle command value calculated by the tilting angle calculating portion.

2. The liquid-pressure driving system according to claim 1, wherein:

the control device includes a reduced torque estimating portion, an excess/deficiency calculating portion, and a torque correcting portion;

the reduced torque estimating portion estimates a reduced torque of the liquid-pressure pump by tilting angle control of adjusting the tilting angle of the liquid-pressure pump to the tilting angle command value;

based on the reduced torque estimated by the reduced torque estimating portion, the excess/deficiency calculating portion calculates an excess or deficiency of the reduced torque with respect to the torque deficiency, the excess or deficiency being generated by a response delay of the tilting angle of the liquid-pressure pump in the tilting angle control; and the torque correcting portion adds the excess or deficiency of the reduced torque to the output value to correct the output value.

3. The liquid-pressure driving system according to claim 2, wherein the reduced torque estimating portion estimates the reduced torque by a transfer function including a first-order lag element.

4. The liquid-pressure driving system according to claim 1, wherein:

the control device includes a command torque limiting portion;

the command torque limiting portion limits the command torque to a maximum allowable torque or less, the maximum allowable torque being larger than the limit value.

5. The liquid-pressure driving system according to claim 1, further comprising:

an electric power supply device configured to supply electric power to the electric motor; and a state value detection sensor configured to detect a state value showing a state of the electric power supply device, wherein the target assist torque limiting portion changes the limit value in accordance with a detection result that is the state value.

6. The liquid-pressure driving system according to claim 1, wherein:

the control device includes a target fuel injection quantity calculating portion, an injection quantity limiting portion, an actual torque calculating portion, a target torque calculating portion, and a difference torque calculating portion;

the target fuel injection quantity calculating portion calculates a target fuel injection quantity corresponding to a target revolution speed;

the injection quantity limiting portion has a function of gradually increasing an actual fuel injection quantity to the target fuel injection quantity calculated by the target fuel injection quantity calculating portion and determines the actual fuel injection quantity such that a time change rate of the actual fuel injection quantity when increasing the actual fuel injection quantity becomes a predetermined value or less;

the actual torque calculating portion calculates an actual torque based on the actual revolution speed detected by the revolution speed sensor and the actual fuel injection quantity determined by the injection quantity limiting portion, the actual torque being output from the engine;

the target torque calculating portion calculates a target torque based on the actual revolution speed detected by the revolution speed sensor and the target fuel injection quantity calculated by the target fuel injection quantity calculating portion, the target torque being applied to a rotating shaft;

the difference torque calculating portion calculates a difference torque that is a deficiency of the actual torque calculated by the actual torque calculating portion with respect to the target torque calculated by the target torque calculating portion; and the target assist torque calculating portion calculates the target assist torque based on the difference torque calculated by the difference torque calculating portion.

7. The liquid-pressure driving system according to claim 1, wherein:

the control device includes an actual fuel injection quantity calculating portion, a torque change estimating portion, and a change torque calculating portion;

the fuel injection quantity calculating portion calculates an actual fuel injection quantity corresponding to a target revolution speed;

the torque change estimating portion estimates a change in the output torque of the engine per unit revolution speed with respect to the actual fuel injection quantity calculated by the fuel injection quantity calculating portion;

the change torque calculating portion calculates a change torque based on the change in the output torque per unit revolution speed, the change torque being used to assist the output torque of the engine, the change being calculated by the torque change estimating portion; and the target assist torque calculating portion calculates the target assist torque based on the change torque calculated by the change torque calculating portion.

* * * * *